(12) United States Patent
Camp, Jr. et al.

(10) Patent No.: US 8,519,982 B2
(45) Date of Patent: Aug. 27, 2013

(54) ACTIVE ACOUSTIC TOUCH LOCATION FOR ELECTRONIC DEVICES

(75) Inventors: William O. Camp, Jr., Chapel Hill, NC (US); Paul Futter, Cary, NC (US); Leland Scott Bloebaum, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 470 days.

(21) Appl. No.: 12/819,719

(22) Filed: Jun. 21, 2010

(65) Prior Publication Data

US 2011/0310028 A1 Dec. 22, 2011

(51) Int. Cl.
*G06F 3/043* (2006.01)

(52) U.S. Cl.
USPC .......................................... 345/177; 345/173

(58) Field of Classification Search
None
See application file for complete search history.

(56) References Cited

U.S. PATENT DOCUMENTS

| | | | |
|---|---|---|---|
| 6,741,237 B1* | 5/2004 | Benard et al. | 345/173 |
| 7,277,087 B2* | 10/2007 | Hill et al. | 345/177 |
| 8,274,480 B2* | 9/2012 | Sullivan | 345/173 |
| 2007/0229479 A1* | 10/2007 | Choo et al. | 345/177 |
| 2009/0273583 A1* | 11/2009 | Norhammar | 345/177 |
| 2010/0026667 A1* | 2/2010 | Bernstein | 345/177 |
| 2011/0025649 A1* | 2/2011 | Sheikhzadeh Nadjar et al. | 345/177 |
| 2011/0074544 A1* | 3/2011 | D'Souza | 340/5.83 |
| 2011/0242059 A1* | 10/2011 | Pasquero et al. | 345/177 |

* cited by examiner

Primary Examiner — Jason Olson
(74) Attorney, Agent, or Firm — Coats & Bennett, P.L.L.C.

(57) ABSTRACT

An electronic device has a display, a controller, and a pair of haptic transducers connected to the display. The controller configures the haptic transducers to momentarily vibrate the display. A pair of sensors disposed on the display detects variations caused by the user touch in the vibrations. Based on an analysis of these variations, the controller can determine the location of the user touch on the touch-sensitive display.

18 Claims, 17 Drawing Sheets

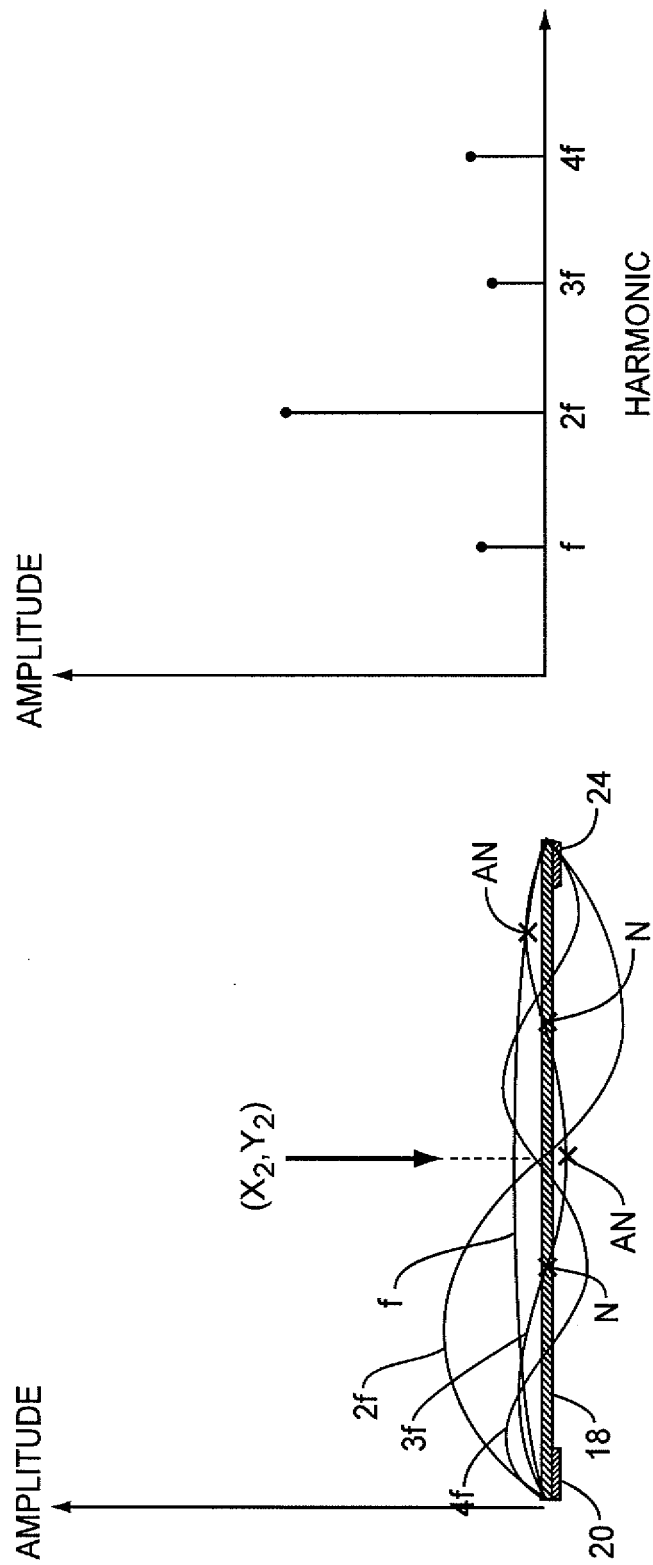

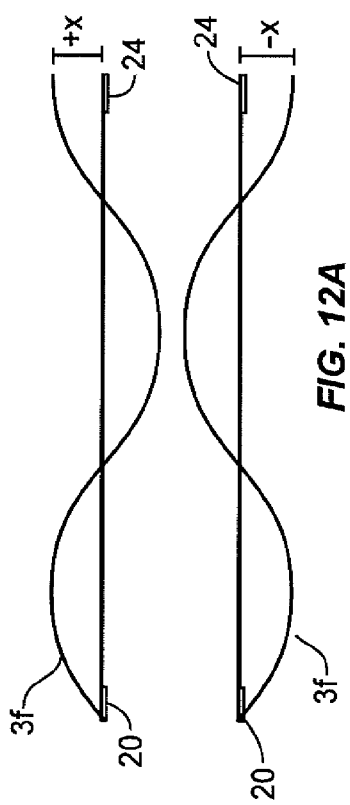
FIG. 12A
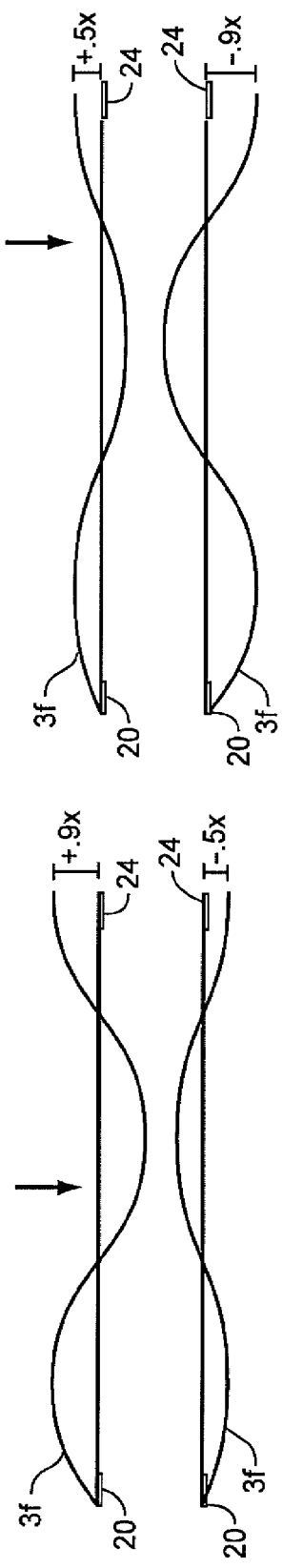
FIG. 12C
FIG. 12B

ACTIVE ACOUSTIC TOUCH LOCATION FOR ELECTRONIC DEVICES

BACKGROUND

The present invention relates generally to electronic devices having displays, and more particularly to electronic devices that implement methods of touch location.

Touch-sensitive displays are commonly used in many different types of electronic devices. As is known in the art, touch-sensitive displays are electronic visual displays configured to detect the presence and location of a user's touch within the display area. Conventionally, touch-sensitive displays detect the touch of a human a finger or hand, but may also be configured to detect the touch of a stylus or of some other passive object. Although there are many different types of touch-sensitive devices, many are configured to detect a user touch by sensing pressure, detecting a change in resistance, or by measuring an amount of reflected light, for example.

Additionally, devices may now determine the location of a user touch by performing a passive sonic analysis of the noise that is made when the user touches the display. In practice, the device includes two microphones placed in carefully selected locations on the surface of the display. When a user touches the display, the microphones capture and analyze the acoustical signatures produced by the touch to determine the location of the touch. For example, the devices may compare the captured acoustic signature to a table of predetermined acoustic signatures that correspond to different locations on the display. If a match is found, the device has determined the location of the user touch.

Although useful, passive acoustic methods of locating the position of a user touch on a display remain problematic. For example, because a user may touch the display at any time, the audio processing function that analyzes the resultant sound must be active all of the time. These types of solutions require a significant amount of power, due both to the sensors and, more importantly, to a processor executing sound analysis software. For smaller, battery-powered devices, such as cellular telephones, this extra power consumption means that the device will require either a larger battery or more frequent recharging, neither of which is desirable from the user's perspective.

Another problem with passive methods is that the display and/or the integration of the requisite mechanical components (e.g., the microphones) must be unique for each model of the device. This is because the ability of the passive acoustic methods to determine the location of a user touch varies across the surface of the display. Consequently, each model must undergo an analysis to determine the correct positioning for both microphones as well as the relationship between the acoustic signatures and the location of the touch.

Further, passive acoustic methods necessarily require a sound to be made when the user touches the display surface. This does not always occur when the user touches the display with a finger. Additionally, even when the microphones do detect the sound of a user touch, the accuracy of any given passive acoustic method may vary with the force of the touch. Moreover, passive acoustic methods may be computationally complex and slow since they involve searching tables of predetermined signatures to obtain one that most closely resembles the captured acoustic signature. Often times, such methods may not be able to provide a closed or unique solution.

Currently, some devices now utilize haptic technology (i.e., "haptics") to render feedback to the user. Haptics is a tactile feedback technology that applies forces, vibrations, and/or motions to a user by vibrating or shaking a display being touched by the user. The devices that cause the vibrations are called "haptic transducers." The user senses these vibrations and perceives them as if the user had depressed a key on a keyboard, for example. Although haptics may be used to induce the user's perception that a key has been depressed, it is not known for use in determining the specific location of a user touch.

SUMMARY

The present invention provides an active acoustic method of determining the location of a user's touch on the display of an electronic device. In one embodiment, a method of determining the location of a user touch on a display of an electronic device. The method comprises vibrating a display on an electronic device, detecting variations in the vibrations caused by a user touch, and determining a location of the user touch on the display based on the detected variations.

In one embodiment, vibrating a display on an electronic device comprises vibrating the display responsive to detecting a user touch on the display.

In one embodiment, vibrating a display on an electronic device comprises generating standing waves to propagate through the display.

In one embodiment, generating the standing waves comprises activating first and second haptic transducers on the display to generate the standing waves.

In one embodiment, detecting the variations caused by the user touch comprises detecting a sound of the standing waves affected by the user touch.

In one embodiment, determining a location of the user touch comprises converting an amplitude of the detected sound into digitized signals, computing an acoustic signature for the amplitude based on the digitized signals, and determining the location of the user touch based on the computed acoustic signature.

In one embodiment, generating standing waves to propagate through the display comprises alternately configuring first and second haptic transducers disposed on the display to operate in a driver mode to generate the standing waves, and a sensor mode to detect the variations caused by the user touch.

In one embodiment, alternately configuring the first and second haptic transducers to operate in the driver mode and the sensor mode comprises configuring the first haptic transducer to operate in the driver mode to generate the standing waves, configuring the second haptic transducer to operate in the sensor mode, and detecting, at the second haptic transducer, the variations in the generated standing waves caused by the user touch.

In one embodiment, the method further comprises configuring the first haptic transducer to operate in the sensor mode, configuring the second haptic transducer to operate in the driver mode to generate the standing waves, and detecting, at the first haptic transducer, the variations in the generated standing waves caused by the user touch.

In one embodiment, determining the location of the user touch comprises, receiving signals from each of the first and second haptic transducers indicating an amplitude of the variations caused by the user's touch in the standing waves, computing a power spectrum value for the variations based on the amplitude, and analyzing the computed power spectrum value to determine the location of the user touch on the display.

In one embodiment, the method further comprises measuring a propagation time of a transient wave at one or more sensors disposed on the display, and determining the location of the user's touch based on the variations caused by the user touch of the transient wave.

In one embodiment, vibrating a display on an electronic device comprises activating first and second haptic transducers disposed on perpendicular sides of the display to generate standing waves to propagate through the display.

In one embodiment, activating the first and second haptic transducers comprises configuring the first and second haptic transducers to vibrate the display at different frequencies.

In one embodiment, detecting the variations caused by the user touch in the vibrations comprises detecting variations caused by the user touch in the generated standing waves using first and second sensors.

In one embodiment, detecting variations caused by the user touch in the generated standing waves using first and second sensors comprises detecting a sound of the variations in the standing wave using first and second microphones.

In one embodiment, detecting variations in the generated standing waves using first and second sensors comprises detecting the variations using the first and second haptic transducers.

In another embodiment, the present invention also provides an electronic device comprising a display, and a controller configured to vibrate the display, detect variations in the vibrations caused by a user touch, and determine a location of the user touch on the display based on the detected variations.

In one embodiment, the display comprises a touch-sensitive display, and wherein the controller vibrates the display responsive to the user touch.

In one embodiment, the device further comprises first and second haptic transducers connected to the display, and wherein the controller is configured to control the first and second haptic transducers to generate standing waves that propagate through the display.

In one embodiment, the device further comprises first and second microphones connected to the display to detect a sound associated with the variations in the vibrations.

In one embodiment, the controller is configured to receive signals from the first and second microphones indicating an amplitude of the sound, compute an acoustic signature based on the received signals, and determine the location of the user touch on the display based on the computed acoustic signature.

In one embodiment, the controller is further configured to alternately operate the first and second haptic transducers in a driver mode to generate the standing waves, and a sensor mode to detect the variations caused by the user touch in the standing waves.

In one embodiment, the controller is further configured to configure the first haptic transducer to operate in the driver mode to generate the standing waves in the display, configure the second haptic transducer to operate in the sensor mode, and detect, at the second haptic transducer, the variations caused by the user touch in the standing waves.

In one embodiment, the controller is further configured to configure the first haptic transducer to operate in the sensor mode, configure the second haptic transducer to operate in the driver mode to generate the standing waves in the display, and detect, at the first haptic transducer, the variations caused by the user touch in the standing waves.

In one embodiment, the controller is further configured to receive signals from each of the first and second haptic transducers indicating an amplitude of the variations caused by the user's touch in the standing waves, compute a power spectrum value for the variations based on the amplitude, and analyze the computed power spectrum to determine the location of the user's touch on the display.

In one embodiment, the controller is further configured to measure a propagation time of a transient wave propagating through the display at one or more sensors disposed on the display, and determine the location of the user's touch based on the variations in the vibrations and on the measured propagation time.

In one embodiment, the device further comprises first and second haptic transducers disposed on perpendicular sides of the touch-sensitive display, and first and second sensors disposed on the display opposite the first and second haptic transducers, respectively. The first and second haptic transducers are configured to generate standing waves in a surface material of the display. The first and second sensors are configured to detect the variations caused by the user's touch in the standing waves.

In one embodiment, the first and second sensors comprise first and second microphones configured to detect a sound associated with the variations.

In one embodiment, the first and second haptic transducers are also the first and second sensors.

BRIEF DESCRIPTION OF THE DRAWINGS

FIGS. 5A and 5B illustrate how the standing waves might propagate through a display if the user touches the display at a second location on the display screen.

FIGS. 12A-12C illustrate a method of resolving ambiguities when computing the location of a user touch according to another embodiment of the present invention.

DETAILED DESCRIPTION

Figure 1:
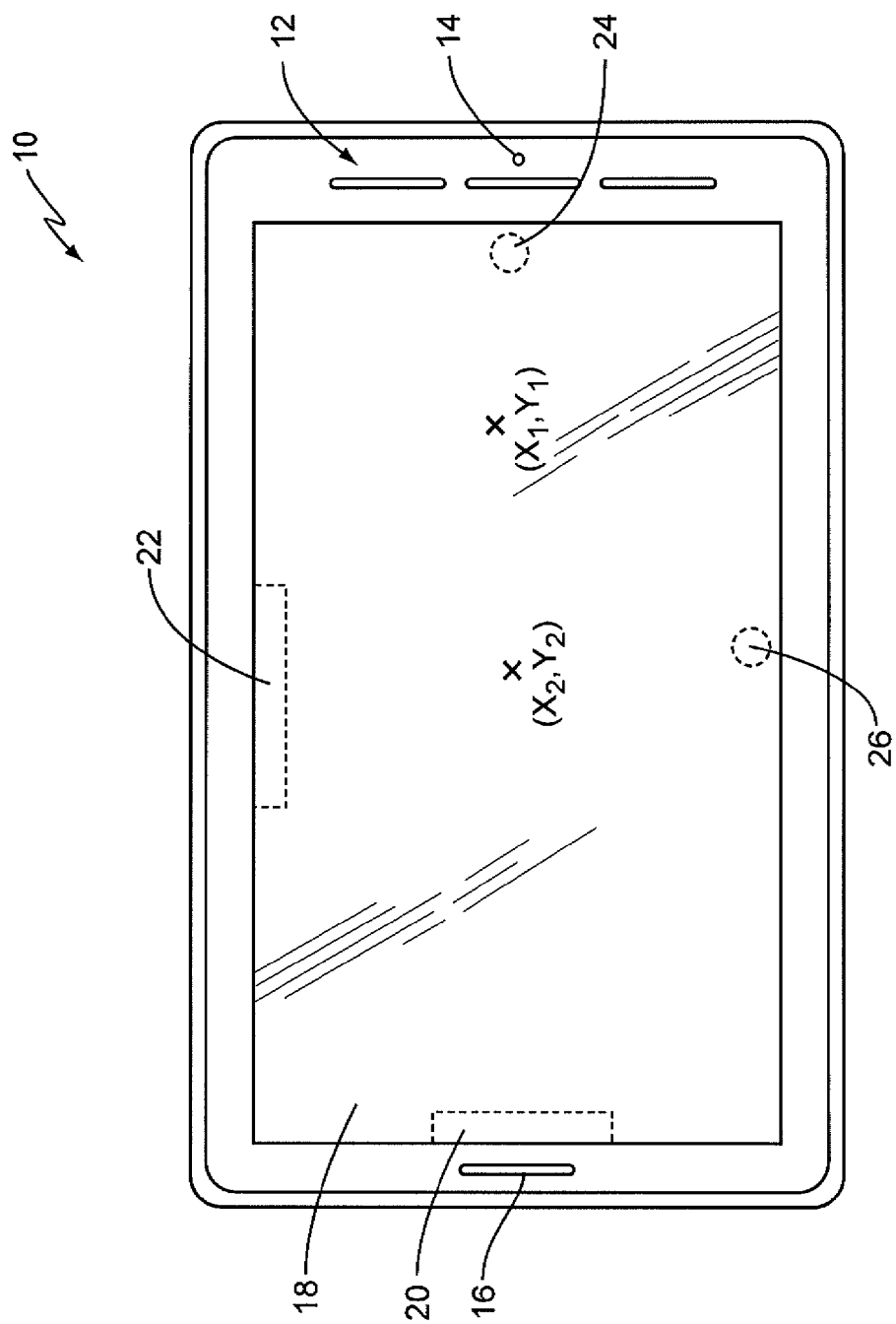
FIG. 1 is a perspective view illustrating an electronic device configured to operate according to one embodiment of the present invention.

The present invention provides a device that can determine the location of a user's touch on a display of the device. Particularly, the device includes a pair of haptic transducers that are connected to a display. These haptic transducers are are typically employed to implement tactile feedback to the user. However, according to the present invention, they are momentarily activated whenever the user touches the display to generate standing waves in the display. The user's touch distorts these standing waves to produce variations in the standing waves. The modified waves are then detected and measured by sensors on the display, and analyzed by a controller to determine the location of the user touch on the display.

When the user touches the display, there may be a sound produced that is associated with the modified standing waves. The sound, which changes responsive to the location of the user's touch, may or may not be audible to the human ear. Therefore, in one embodiment, the sensors that detect and measure the distortions comprise a pair of microphones having a frequency response that is within the audible range of the human ear. In other embodiments, microphones or other devices having a sub-audible or super-audible frequency response are used as sensors.

Regardless whether the sound is or is not audible, however, the microphones that detect the sound generate signals that are digitized and sent to a controller. Based on the digitized signals, the controller computes an acoustic signature for the detected sound. The acoustic signature will vary in a predictable manner depending on the location of the user touch. Therefore, the controller can analyze the acoustic signature and determine the location of the user's touch based on the analysis.

In another embodiment, the haptic transducers perform a dual function in that they first function as a vibrator to vibrate the display, and then as a sensor to detect the distortions to those vibrations. Particularly, a first haptic transducer is momentarily activated to generate the standing waves in the display. The second haptic transducer, however, is configured to sense the distortions caused by the user's touch to those standing waves. Then, the roles of the transducers are reversed such that the second haptic transducer is momentarily activated to generate the standing waves in the display, and the first haptic transducer is configured to sense the distortions caused by the user touch to those standing waves. Each haptic transducer provides its sensor readings to the controller, which analyzes them to determine the location of the user's touch.

It should be noted that the following embodiments are described in terms of standing waves of acoustic energy. However, the present invention is not limited solely to the use of standing waves. Those skilled in the art will readily appreciate that it is also possible to utilize transient waves of acoustic energy. Transient waves are those that only exist for a limited time T such that standing waves do not have a chance to fully form. This length of time T may be influenced by a number of different factors. For example, one factor is the amount of acoustic energy that is dissipated versus the amount of acoustic energy that stored in the mechanical structure of the device. Particularly, as a greater amount of acoustic energy is lost or dissipated, standing waves will form more quickly and vice versa. Knowing this limited time T can be useful when considering the propagation time of acoustic energy across the display. Particularly, a transient wave would last for a time that is shorter than it would take for the acoustic energy to propagate across the display. In such cases, other measurements such as propagation times or times of arrival of acoustic energy can be measured with a high degree of accuracy.

Turning now to the drawings, FIG. 1 illustrates a perspective view of a front face of a cellular telephone device 10 configured according to one embodiment of the present invention. Device 10 comprises, inter alia, a set of global controls 12 to enable a user to control the functionality of device 10, as well as a microphone and a speaker 14 16 to allow the user to communicate with one or more remote parties via a wireless communication network (not shown).

Device 10 also comprises a display 18, first and second haptic transducers 20, 22 and a pair of sensors 24, 26, which in this embodiment, comprise a pair of microphones. Display 18 in this embodiment is a touch-sensitive display that is configured to detect the user's touch at different locations on the display (e.g., $(X_1, Y_1)$ and $(X_2, Y_2)$). The haptic transducers 20, 22 are positioned on the display 18 and along two perpendicular sides of display 18. The microphones 24, 26 are also placed on the display 18 along the other two perpendicular sides opposite the haptic transducers 20, 22. The exact positioning of the haptic transducers 20, 22 and of the microphones 24, 26 along the sides of display 18 are not critical; however, in one embodiment, microphone 24, 26 is displaced slightly inward from the edges of the display 18 toward the center of display 18. This placement allows the microphones 24, 26 to sufficiently detect the acoustic properties of the modified vibrations, and thus, more accurately determine the location of the user's touch.

Figure 2A:
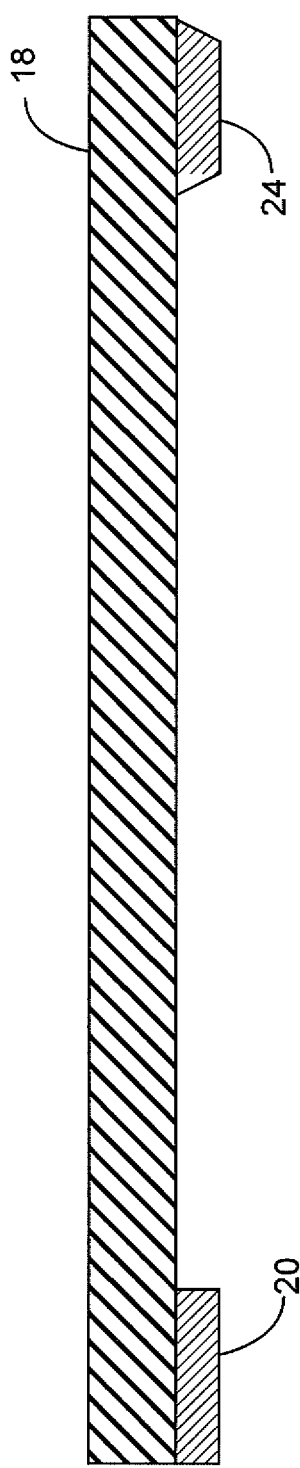
FIGS. 2A and 2B are cross-sectional views of a display surface configured to operate according to one embodiment of the present invention.
Figure 2B:
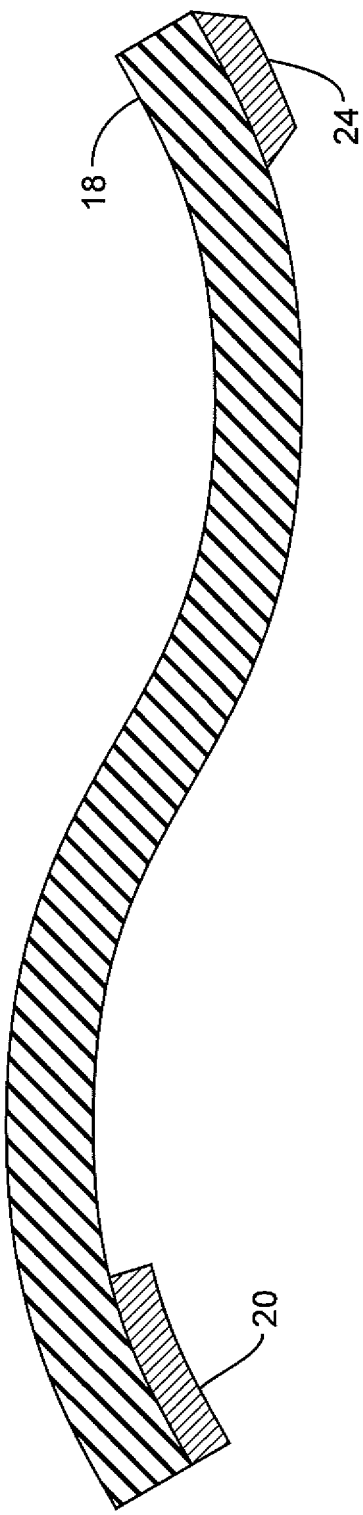

As previously stated, the haptic transducers 20, 22 are activated in response to the user's touch on display 18 to cause vibrations in the material of the display 18. FIGS. 2A-2B illustrate this aspect of the invention in more detail. Particularly, FIGS. 2A and 2B illustrate a cross sectional view of display 18 showing the haptic transducer 20 on one side and the corresponding microphone 24 on the other. Although only one haptic transducer 20 and microphone 24 is illustrated here, those skilled in the art will appreciate that this figure is merely illustrative of the operation of both haptic transducers 20, 22 and both microphones 24, 26.

In FIG. 2A, the user has not touched display 18 and as a result, display 18 is at rest (i.e., display 18 is not vibrating). However, as seen in FIG. 2B, the touch-sensitive display 18 generates a signal to a controller to momentarily activate both the first and second haptic transducers 20, 22 when the user touches the display 18 (e.g., at location $(X_1, Y_1)$ or $(X_2, Y_2)$ seen in FIG. 1). Particularly, the haptic transducers 20, 22 vibrate a surface of the display 18 to create standing waves in the display surface. More particularly, the haptic transducers 20, 22 generate the standing waves at a frequency f, commonly known as the "fundamental," and at a plurality of multiples of the fundamental, commonly known as "harmonics." As stated above, the user's touch distorts or modifies the standing waves. The microphones 24, 26, detect the sound of these modified standing waves, which varies in a predictable manner depending on the location of the user's touch.

More particularly, the distortions or modifications to the standing waves caused by the user touch differ based on the location of the touch relative to the haptic transducers 20, 22. That is, a user touch at a position on the display that is relatively near haptic transducer 20 (e.g., position $X_2, Y_2$) will distort the standing waves differently than if the user touch had occurred at another position farther away from the haptic transducer 20 (e.g., position $X_1$, $Y_1$). The microphones 24, 26 detect sounds created when the user touches the display 18 at either location, but would generate different signals based on the sounds because the touches occurred at different locations. As such, an acoustic signature of a given modified standing wave is unique, allowing the controller in device 10 to calculate the location of the user touch from the sound detected by the microphones 24, 26.

Figure 3B:
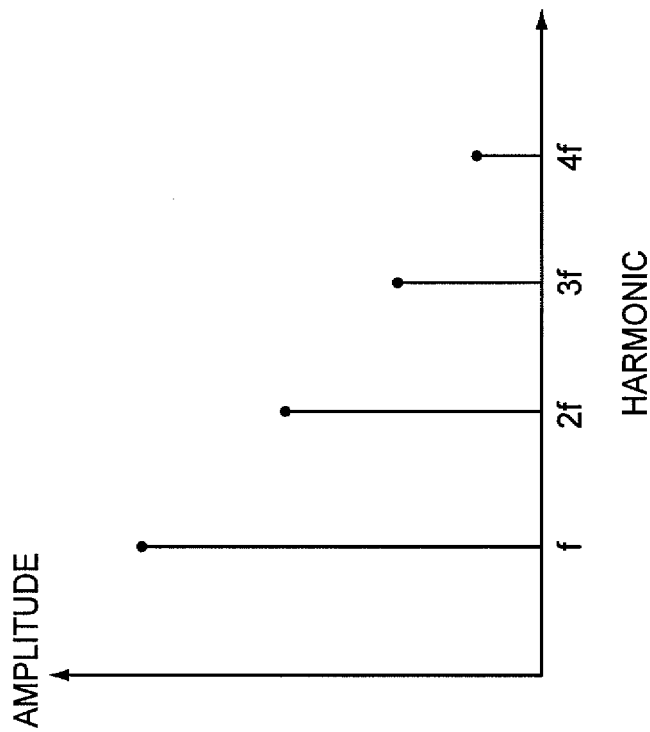
FIGS. 3A and 3B illustrate how the standing waves might propagate through a display if the user does not touch the display.
Figure 3A:
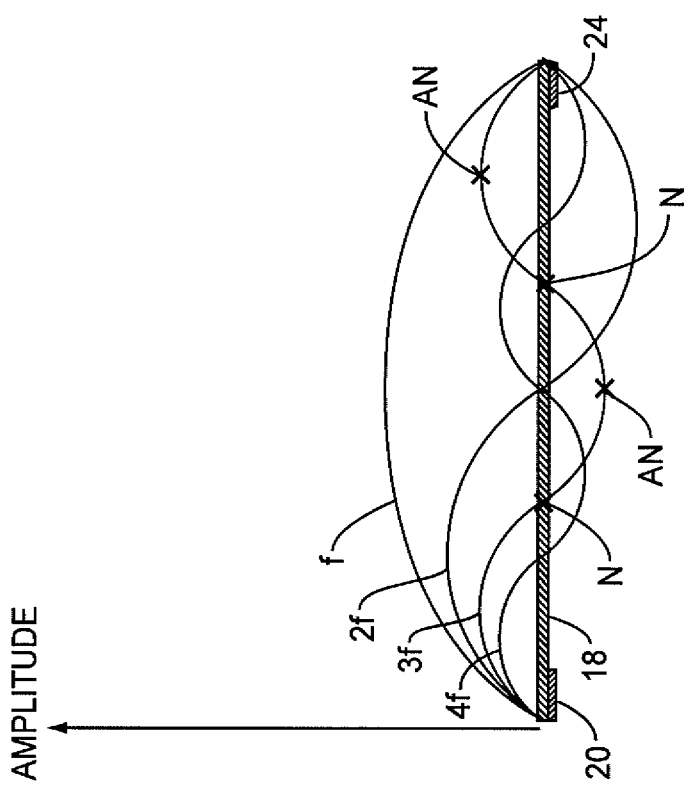

FIGS. 3-5 illustrate this aspect of the present invention in more detail. In some of these figures, the display 18 is seen along with the haptic transducer 20 and the microphone 24 for reference. Only the standing waves for the first four harmonic frequencies are shown in these figures. These are the first harmonic frequency or "fundamental" frequency f, the second harmonic frequency 2f (i.e., twice the fundamental), the third harmonic frequency 3f (i.e., three times the fundamental), and the fourth harmonic frequency 4f (i.e., four times the fundamental). Each standing wave has a node N (i.e., the point of a wave having minimal amplitude) and an anti-node AN (i.e., the point of a wave having maximum amplitude), although for illustrative purposes, the node N and the anti-node AN for only one of those waves (i.e., 3f) is shown. Note that while four harmonics are shown in the figures, a larger number may be present in some embodiments. FIG. 3A illustrates the standing waves generated by the haptic transducer 20 along a longitudinal axis of display 18 as they might appear if no finger or stylus touches display 18. FIG. 3B is a corresponding graph illustrating the amplitudes of the first four harmonic frequencies f, 2f, 3f, 4f as they might appear if no user touches the display 18. As seen in FIG. 3B, each harmonic frequency f, 2f, 3f, 4f has a different amplitude.

Since the frequency causing the standing waves in display 18 is known, the amplitudes for each wave are readily measurable. Further, as stated previously, the user's touch will disturb these waves in predictable ways such that a unique modified wave is generated for any given touch location on the display 18. According to this embodiment of the present invention, the sound of the unique modified standing wave that is caused by the user's touch can be analyzed to determine the location of the user's touch.

Figure 4B:
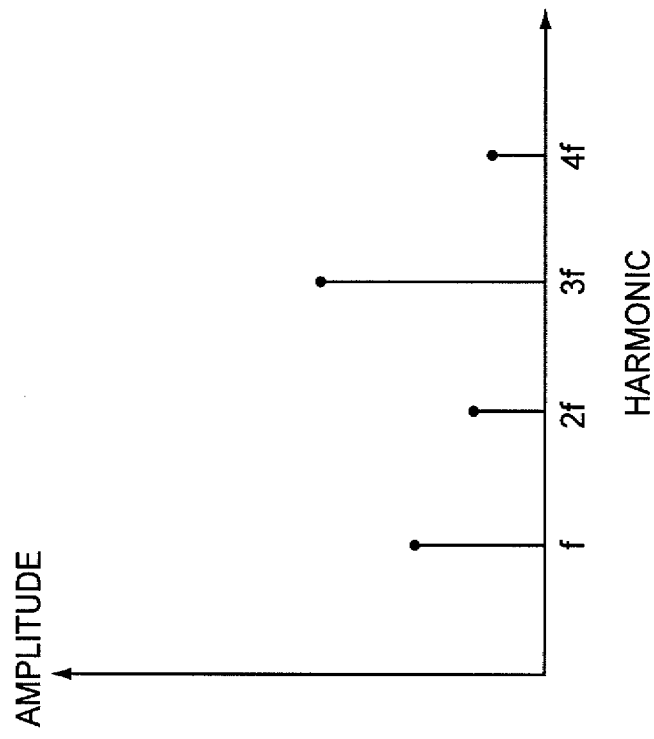
FIGS. 4A and 4B illustrate how the standing waves might propagate through a display if the user touches the display at a first location on the display screen.
Figure 4A:
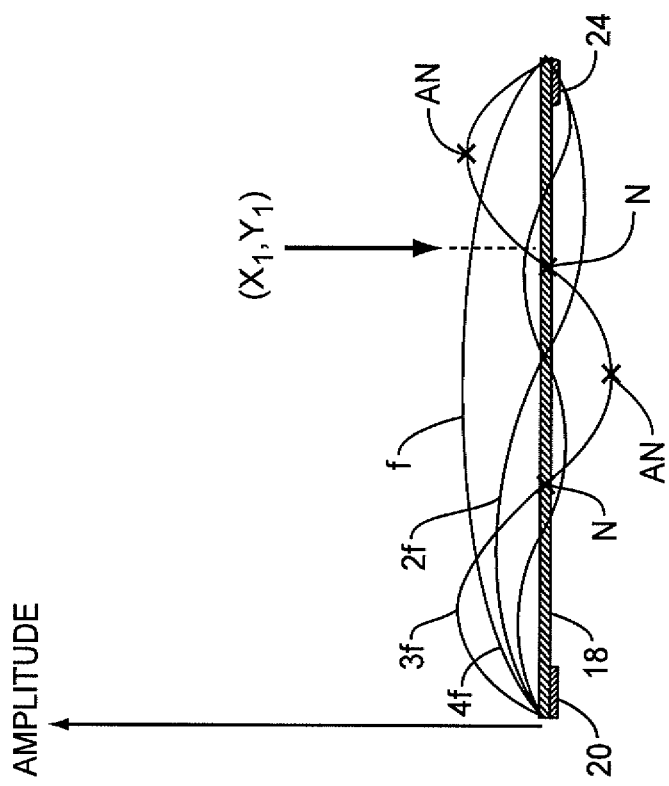

For example, FIGS. 4A-4B illustrate the effects of a user touch on the generated standing waves if the user touch occurs at a position on the display pointed to by the arrow (e.g., $X_1$, $Y_1$). As seen in FIGS. 4A-4B, the user's touch at position ($X_1$, $Y_1$) on display 18 reduces the amplitudes of the standing waves for the harmonic frequencies f, 2f, and 4f. However, the amplitude for the third harmonic frequency 3f is not as greatly affected due to the location of the user touch. Specifically, one or more of the amplitudes are reduced depending upon how near, or how far, the touch location is from the nodes N of the harmonic frequencies. Using the third harmonic 3f as an example, user touches that occur at a location on display 18 nearest a node N for a given harmonic frequency will reduce the amplitude of that standing wave less than if the touch had occurred nearer an anti-node AN of the harmonic frequency.

In another example, FIGS. 5A-5B illustrate the effects of a user touch at location ($X_2$, $Y_2$) on display 18, indicated by the arrow. In this example, the location of the user touch is very near an anti-node AN of the third harmonic 3f, as well as near an anti-node of the fundamental frequency 1f. However, the location is also farthest way from the nodes N of the second and fourth harmonic frequencies 2f, 4f. Consequently, the amplitudes of the standing waves for the first and third harmonic frequencies 1f, 3f are reduced more by the user's touch than are those for the second and fourth harmonic frequencies 2f, 4f.

Figure 6:
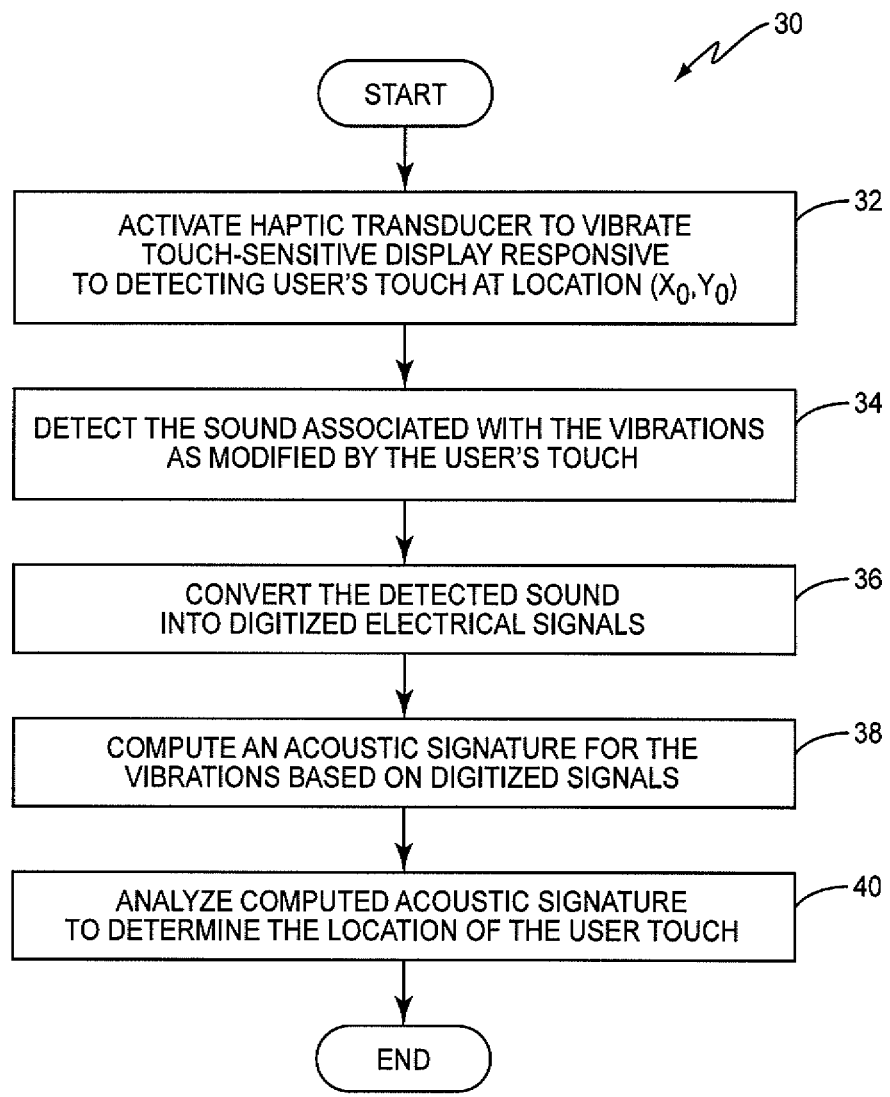
FIG. 6 is a flow chart illustrating a method of locating a user touch according to one embodiment of the present invention.

FIG. 6 is a flow diagram illustrating a method 30 of performing one embodiment of the present invention. Method 30 begins when, upon detecting the user's touch on display 18 at a location (e.g., location $X_1$, $Y_1$), device 10 activates the first and second haptic transducers 20, 22 to vibrate the touch-sensitive display 18 (box 32). This causes the standing waves to propagate through display 18, which are modified in a known manner based on the location of the user touch. The microphones 24, 26 disposed on the display 18 detect the sound that is associated with these modified standing waves and caused by the user's touch (box 34). The microphones 24, 26 then send analog signals indicating the amplitude of the detected sound to processing circuitry for conversion into digitized electrical signals. The digitized electrical signals are then sent to a controller or other processor in device 10 (box 36). Upon receipt, the controller determines the location of the user touch based on the digitized signals. As described in more detail later, the location may be determined in different ways; however in at least one embodiment, the controller computes an acoustic signature for the sound generated by the modified standing waves based on the digitized electrical signals (box 38), and analyzes the computed acoustic signature to determine the location of the user's touch (box 40).

Determining touch location in accordance with the present invention provides benefits that conventional methods of determining touch location do not. For example, with the present invention, the haptic transducers 20, 22, the microphones 24, 26, and the other resources that are needed to determine the location of a user's touch are activated only when a user touches the display 18. For example, the display 18 may be configured to detect a user touch by sensing pressure, detecting a change in resistance, or by measuring an amount of reflected light. They do not need to be continually active and monitoring for a user touch, as is required by conventional devices that use a passive approach. Thus, a device using the active approach of the present invention consumes less power than does a device that employs the conventional passive acoustic approach of determining touch location. Further, the method of the present invention relies on the acoustic signature of the modified standing waves, which are caused by the user touch in a given location. As such, the amount of force with which a user touches the display has a minimal effect on the ability of a controller to determine an accurate location for the touch.

Another benefit results from the manner in which the touch location is computed from the modified amplitudes. Specifically, any location on display 18 can easily be computed using known mathematical processes to interpret the unique acoustical signatures of the modified standing waves. Thus, there is no need in the present invention to determine exact locations for the placement of the microphones 24, 26 on display 18, as must be done for conventional devices using a passive acoustic approach. This reduces the impact of the unique mechanical design aspects required by conventional devices. Additionally, as described in more detail later, the present invention computes the location of the user's touch on display 18 based on the acoustic signature rather than compare it to one or more known acoustic signatures stored in memory. Such computations negate the need to store multiple acoustic signatures in one or more sets of tables, as well as the need to conduct an exhaustive search of those tables. Accordingly, the method of the present invention is faster at determining the location of a user touch than is a conventional device.

Figure 7:
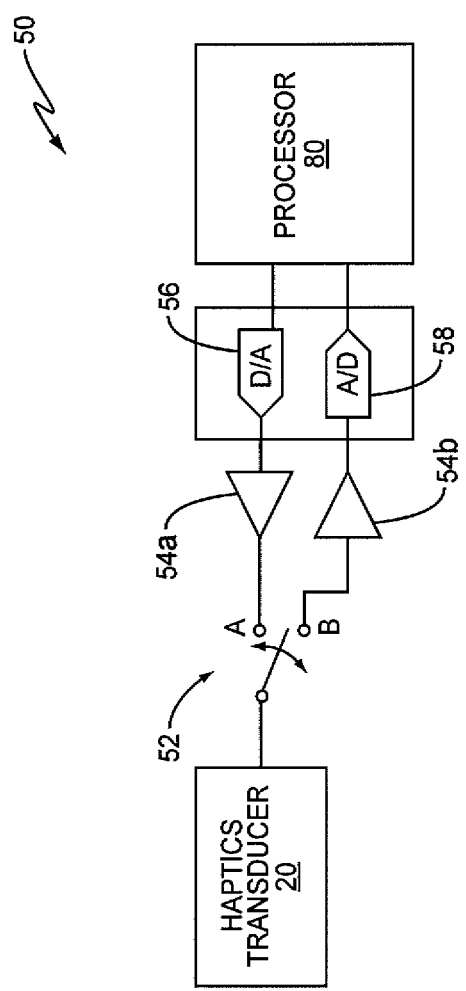
FIG. 7 is a block diagram illustrating a circuit that may be used to control the operating modes of a transducer according to one embodiment of the present invention.

The use of microphone 24, 26 as sensors is only one embodiment. FIGS. 7-8 illustrate another embodiment of the present invention that does not require microphones 24, 26 as sensors. Instead, with this embodiment, each haptic transducer 20, 22 performs a dual function. Particularly, each haptic transducer 20, 22 is first used actively as a driver (i.e., in a "driver mode") to generate the standing waves in display 18, and then passively as a sensor (i.e., in a "sensor mode") to detect the distortions or modifications of the standing waves that are caused by the user's touch. Switching the haptics transducers 20, 22 between these two operating modes may be accomplished using any means known in the art. However, in one embodiment seen in FIG. 7, device 10 utilizes a mode switching circuit 50 to switch haptic transducer 20 between the "driver mode" and the "sensor mode."

Circuit 50 comprises a switch 52 that alternately connects and disconnects the haptics transducer 20 to a pair of amplifiers 54a, 54b. A Digital-to-Analog (D/A) converter 56 converts digital signals from controller 80 into analog signals for the haptics transducer 20, while an Analog to Digital (A/D) 58 converts analog signals from the haptics transducer 20 into digital signals for the controller 80. The controller 80, which is described in more detail later, performs the calculations necessary to determine the location of a user's touch on display 18, and generates control signals to operate switch 52 to switch the mode of the haptics transducer 20 between a driver mode and a sensor mode.

Figure 8A:
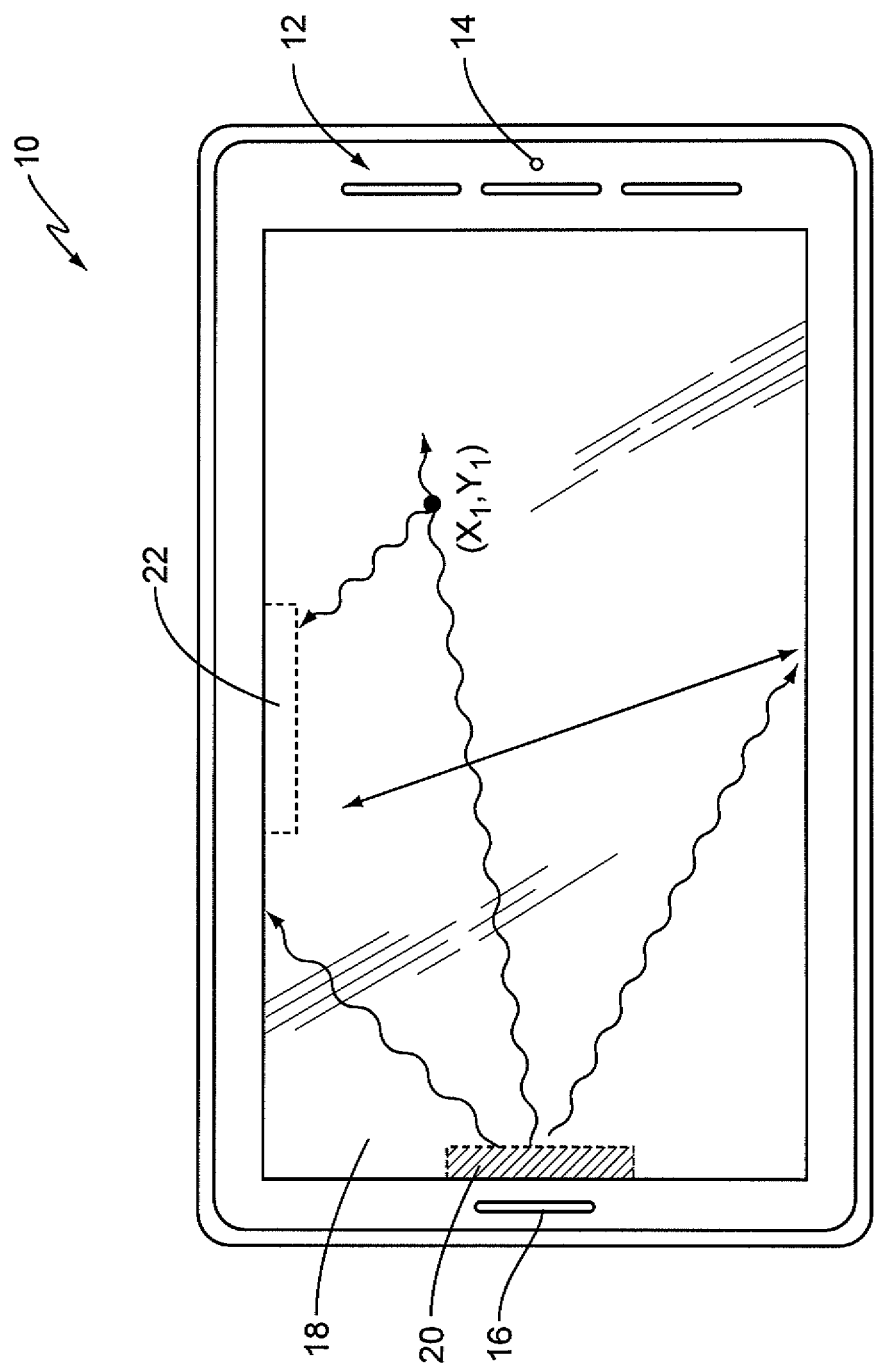
FIGS. 8A and 8B are perspective views of an electronic device configured to operate according to another embodiment of the present invention.
Figure 8B:
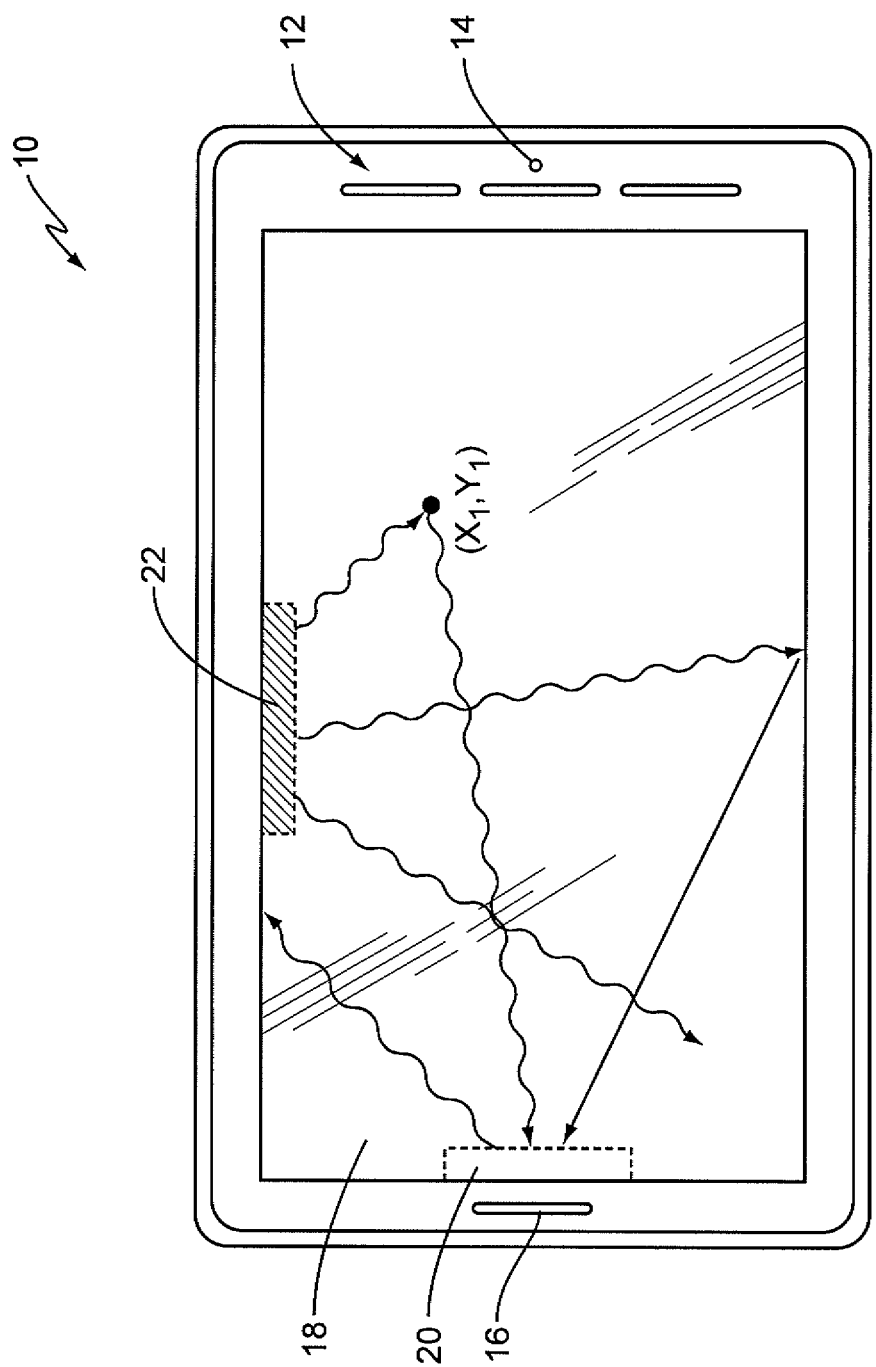

FIGS. 8A-8B illustrate this embodiment in more detail. As seen in FIG. 8A, device 10 momentarily activates a first one of the haptic transducers 20 in a driver mode to vibrate display 18 responsive to detecting the user touch at location ($X_1, Y_1$). The other haptic transducer 22 is left in a sensor mode to passively sense the amplitudes of the modified standing waves. Then, as seen in FIG. 8B, the roles of the haptic transducers 20, 22 are reversed. That is, device 10 momentarily activates the other haptic transducer 22 in the driver mode to vibrate the display 18 and switches the first haptic transducer 20 to the sensor mode so that it can sense the resultant amplitudes of the modified standing waves. As above, the standing waves are modified in a predictable manner depending upon the location of the user's touch. Based on the information provided by haptic transducers 20, 22 when in the sensor mode, a controller 80 in device 10 can accurately compute the location of the user touch on display 18.

Figure 9:
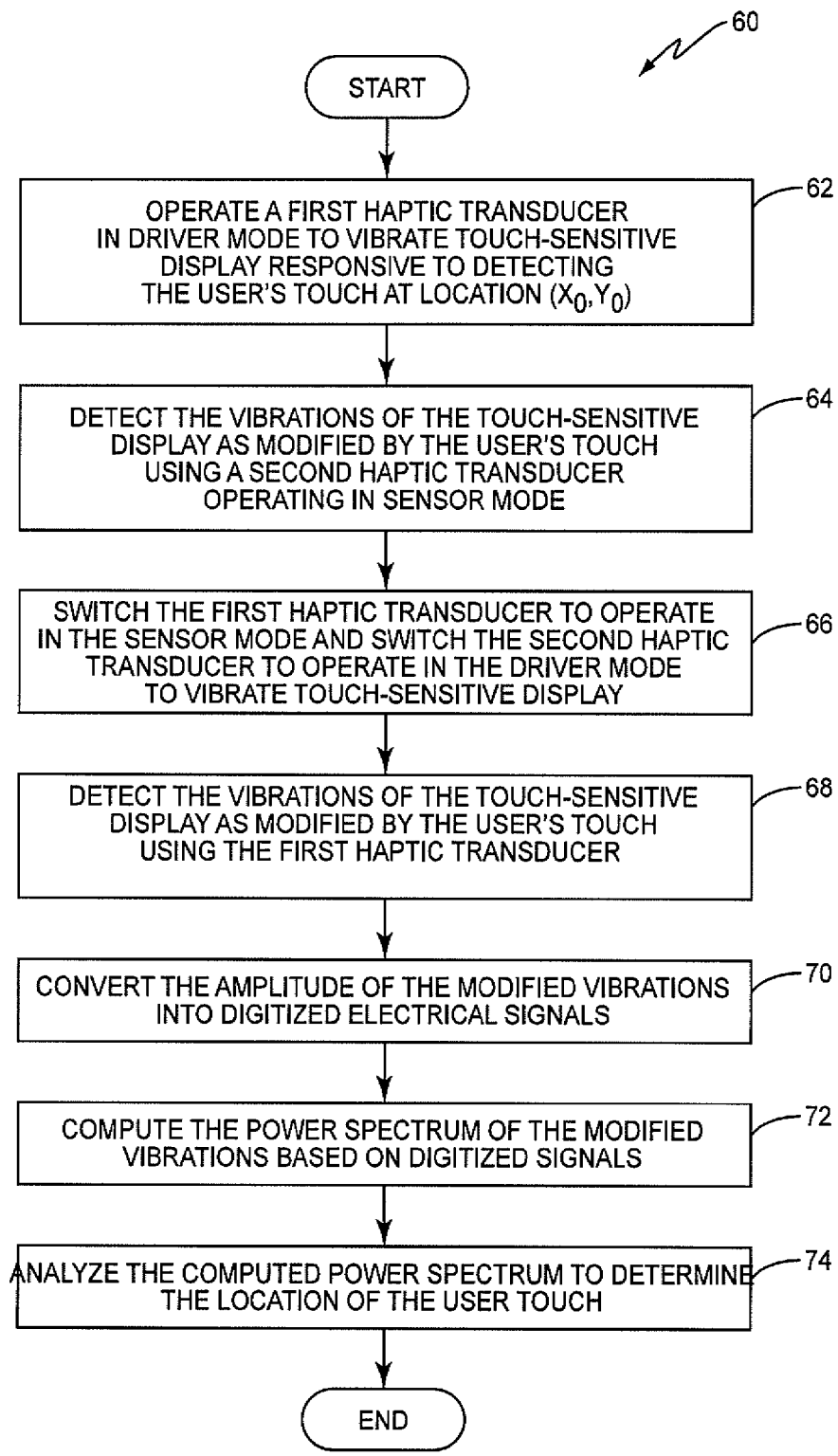
FIG. 9 is a flow chart illustrating a method of locating a user touch according to another embodiment of the present invention.

FIG. 9 is a flow chart that illustrates a method 60 of implementing touch location on device 10 using the haptic transducers 20, 22 in alternating driver and sensor modes. Method 50 begins with device 10 momentarily activating first haptic transducer 20 in the driver mode responsive to detecting the user's touch (box 62). As the first haptic transducer 20 vibrates the display 18, the second haptic transducer 22 is switched to operate in the sensor mode. This allows the second haptic transducer 22 to detect the amplitudes of the standing waves generated by the first haptic transducer 20 as they are modified by the user's touch (box 64). Next, the device 10 switches the first haptic transducer 20 to sensor mode and momentarily switches the second haptic transducer 22 to driver mode (box 66). While in driver mode, the second haptic transducer 22 generates the standing waves in display 18 while the first haptic transducer 20 operating in sensor mode detects the amplitudes of the resultant modified standing waves in display 18 (box 68).

While in the sensor mode, each haptic transducer 20, 22 provides analog signals to the A/D converter 58 representing the detected amplitudes of the modified standing waves. The A/D converter 58 converts these signals into digitized electrical signals for the controller 80 (box 70). Controller 80 then computes the power spectrum of the modified vibrations based on the digitized electrical signals (box 72), and determines the touch location based on those computations (box 74).

While the previous embodiments provide an accurate location for the user's touch, the present invention also allows for the use of time to improve the accuracy and/or resolve ambiguities in the result. Specifically, the display 18 has known dimensions and is manufactured from a known material. Therefore, based on the signals provided by each haptic transducer 20, 22 when operating in the sensor mode, the controller 80 can determine added information by analyzing the time of travel of the generated vibrations propagating across the display 18. This includes those vibrations or waves that reflect off a side of the display 18 towards whichever haptic transducer 20 or 22 is operating in the sensor mode. The additional information can be digitized and provided to controller 80 in device 10 to increase accuracy and/or remove ambiguities in determining the location of the user touch.

For example, in the embodiment shown in FIGS. 8A and 8B, it is also possible to consider the nature of the acoustic wave as a transient wave rather than a standing wave. The short length of time of the acoustic generation would allow for the propagation times to be accurately measured. Particularly, measuring the time of arrival of transient waves generated at the haptic transducer, as well as the perturbation due to the touching finger and from the other sidewalls, can be combined and utilized to determine the location of the touching finger. This can also be applied to embodiments of the present invention that utilize microphones that are separate from the haptics transducers.

Figure 10:
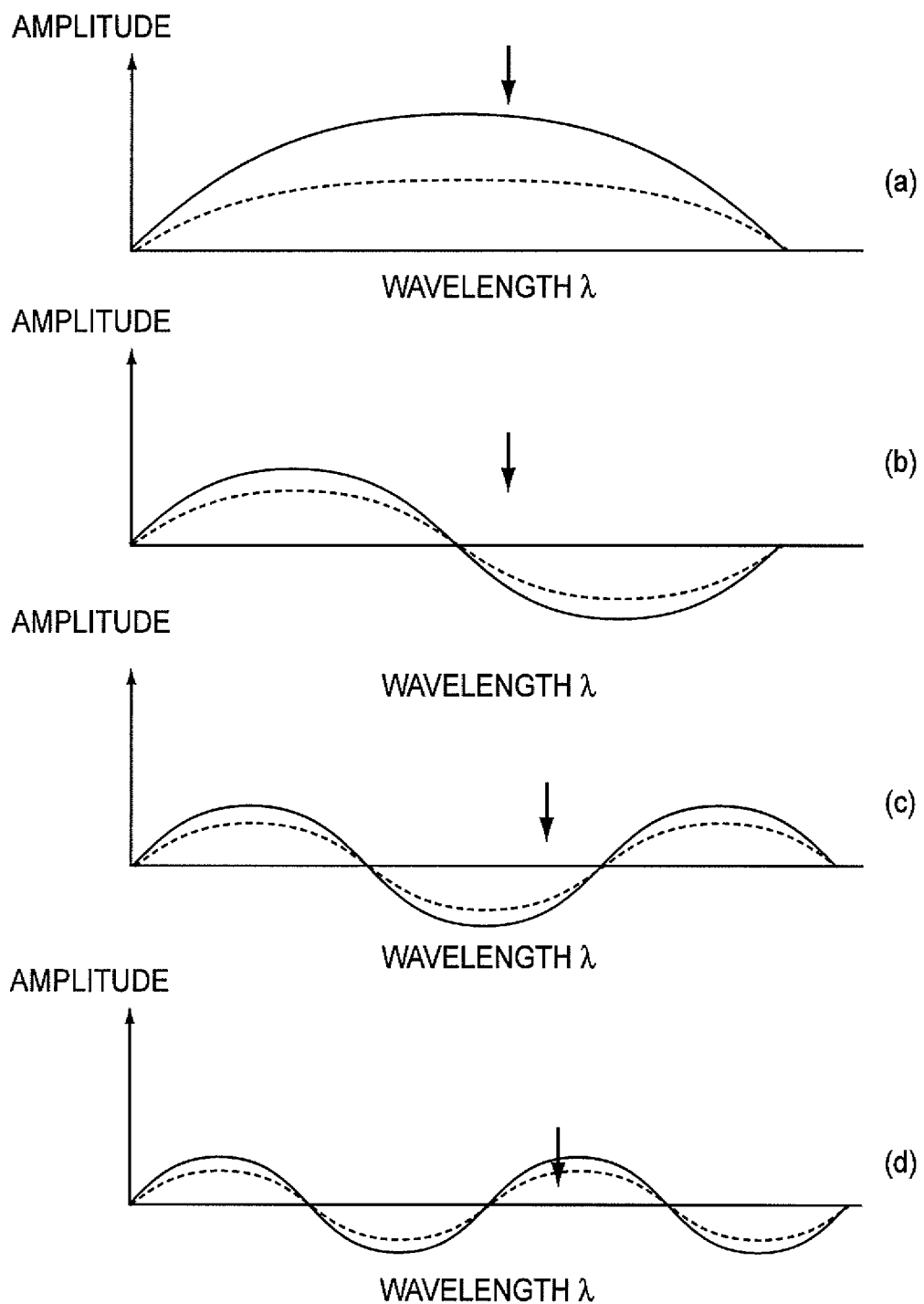
FIG. 10 shows graphs illustrating how a controller might implement a method of the present invention to determine the location of a user touch according to one embodiment.

FIGS. 10-13 illustrate how a controller or other processor in device 10, such as controller 80, may operate to compute the location of a user touch according to one embodiment of the present invention. Particularly, FIG. 10 shows four graphs illustrating the first four harmonic frequencies generated by the haptic transducers 20, 22. The first harmonic, or fundamental frequency f, is seen in the graph labeled (a). The second, third, and fourth harmonics are seen in the graphs labeled (b), (c), and (d), respectively. The arrows indicate the position of a user touch on display 18. The solid lines indicate a standing wave as it might appear unaffected by the user's touch. The dotted lines indicate the same standing wave as distorted or modified by the user touch at a particular location. As stated above, the sensors (i.e., the microphones 24, 26, or the haptic transducers 20, 22 acting passively as sensors) would detect the modified standing waves and provide analog signals representing the amplitudes of the modified standing waves to the A/D converter 58. The A/D converter 58 would then generate digitized samples of these signals for use by the controller 80 in device 10 according to the method of the present invention.

Upon receipt of the digitized signals, the controller may use any number of processes with which to compute or determine the location of the user touch on display 18. In at least one embodiment, however, controller 80 first analyzes the digitized signals to determine which region of the display 18 the touch occurred. For example, the controller 80 could determine which half of a display 18 (i.e., upper half, lower half) a touch occurred by analyzing the digitized samples of the modified standing wave associated with the fundamental frequency f. In a similar manner, the controller 80 could analyze the digitized samples of the modified standing wave associated with the second harmonic frequency 2f to determine whether the touch occurred towards an edge of the display 18 or more towards the center of display 18. As seen in graph (b) of FIG. 10, the touch occurred more towards the center of the display 18. Analyzing the third and fourth harmonics 3f and 4f (graphs (c) and (d), respectively), would allow the controller 80 to determine that the touch occurred in a central region of display 18, and more particularly, at or near a point on display 18 corresponding to node N of the fourth harmonic 4f. From these exemplary graphs, it is apparent to one skilled in the art that the location of the user touch may be determined with even higher resolution and/or accuracy by analyzing the effects of the user touch on the amplitudes of a greater number of harmonic frequencies (e.g., fifth harmonic, sixth harmonic, etc.).

In addition to the above, the present invention also provides a method of resolving ambiguities when determining the location of the user's touch. Depending on the sensor used, there are a number of ways to resolve these ambiguities. For example, the ambiguities may be resolved by using the acoustic signature of the standing waves that have been modified by the user's touch. When using the acoustic signature, one embodiment of the present invention analyzes wavelength λ of the standing wave with fundamental frequency f) relative to the length or width of the display 18 (i.e., the dimension of the display in either the 'X' or 'Y' direction, respectively). Particularly, device 10 determines whether the wavelength λ of the standing wave with fundamental frequency f is less than one-half the length of the display 18. Then, the device 10 determines the amplitude of the standing wave that was modified or attenuated by the user touch. Amplitudes that are subject to a greater amount of attenuation indicate user touches occurring at locations that are farther away from a haptic transducer than those that are subject a lesser amount of attenuation. As previously stated, the location of the user's touch relative to a node N or anti node AN of a standing wave for a given harmonic will affect the amount of attenuation imparted on the amplitude of that standing wave.

Figure 11C:
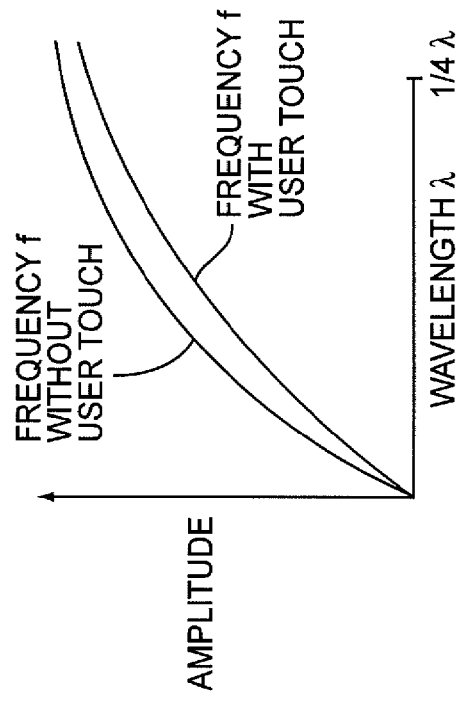
FIGS. 11A-11C show graphs that illustrate a method of resolving ambiguities when computing the location of a user touch according to one embodiment of the present invention.
Figure 11A:
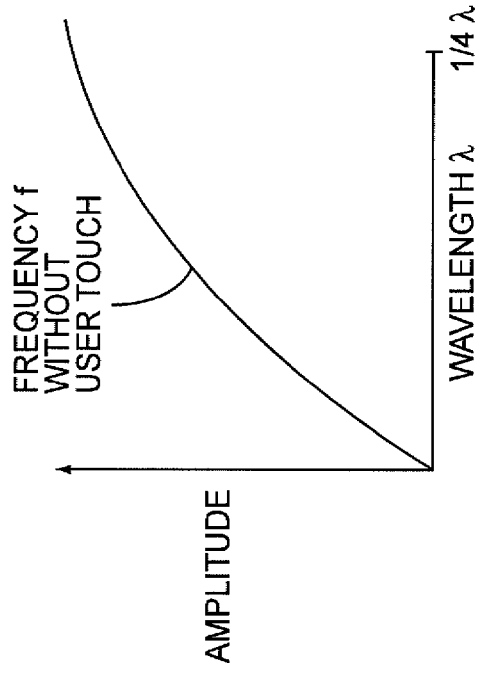
Figure 11B:
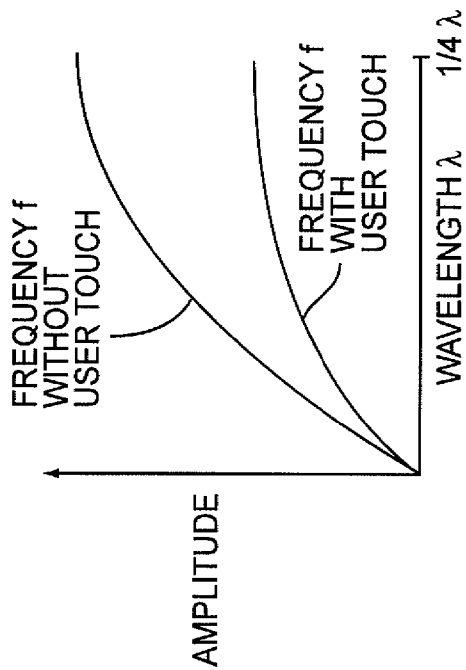

FIGS. 11A-11C illustrate this aspect in more detail. Specifically, FIG. 11A illustrates a standing wave of fundamental frequency f, whose corresponding wavelength λ is approximately four times the width of display 18. In other words, the width of the display is approximately ¼ of the wavelength λ corresponding to the fundamental frequency f. FIG. 11A shows the standing wave with fundamental frequency f as it might appear when the user is not touching the display 18. In this example, the haptics transducer is located on the right hand side of the graph, driving the acoustic signal with maximum amplitude at that location. Because the left side of the graph (the far side of the display from the haptics transducer, is ¼ wavelength away it can be null if the display 18 is rigidly held at that edge. If the user touches the display 18 at a location that is relatively near to the haptic transducer (seen in FIG. 11B), the amplitude of the standing wave for fundamental frequency f will be attenuated more than if the user touch had occurred at a location that was relatively further from the haptic transducer (FIG. 11C). According to one embodiment of the present invention, the controller can use this relationship to eliminate and/or reduce phase ambiguities that might occur when analyzing the attenuations on the higher harmonics. If the display 18 is not held rigidly but has some degree of movement, the null will be less pronounced but will still be attenuated more on the far edge than on the driven edge of the display and will still work as described.

In another embodiment, the present invention utilizes the phase of the modified standing waves received by the sensors such as microphone 24, 26 to resolve ambiguities. As seen in FIGS. 12A-12C, for example, one of the harmonic frequencies can be analyzed to resolve ambiguities in determining the location of the user touch on display 18. These particular figures show the use of the third harmonic frequency 3f having a wavelength of about 1.5 times the width of the display. However, other harmonics at other wavelengths may be used as well.

FIG. 12A illustrates harmonic 3f as it might appear if the user does not touch the display 18. Particularly, the standing wave sensed by microphone 24 is in phase with the vibrations transmitted by the haptic transducer 20 opposite the microphone 24. However, when the user is touching the display 18, the phase of the generated waves is distorted. Therefore, for any given harmonic frequency and any given touch location, the device 10 can resolve which phase is occurring by measuring the difference between the amplitudes at two points in time when the transmitted vibrations have a 180-degree phase difference. For example, FIG. 12B illustrates how the phase of the standing wave could be distorted or modified when the user touch occurs at a first location on display 18. FIG. 12C illustrates how the phase of the standing wave could be distorted or modified when the user touch occurs at a second, different location on display 18. As seen in these figures, the phase differences are unique for each location. Thus, the device 10 can use this phase-difference information to resolve ambiguities when determining the location of the user touch.

Figure 13A:
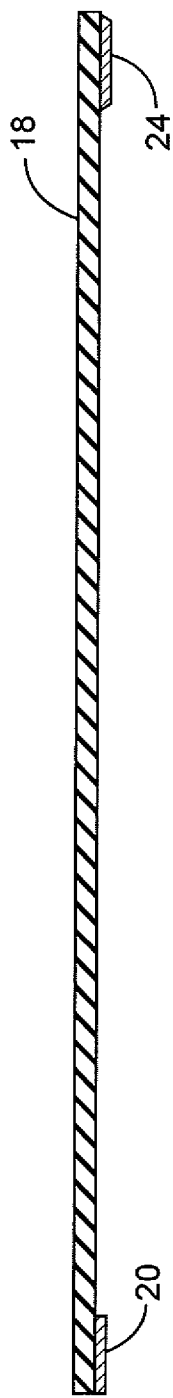
FIGS. 13A-13D illustrate a method of resolving ambiguities when computing the location of a user touch according to another embodiment of the present invention.
Figure 13B:
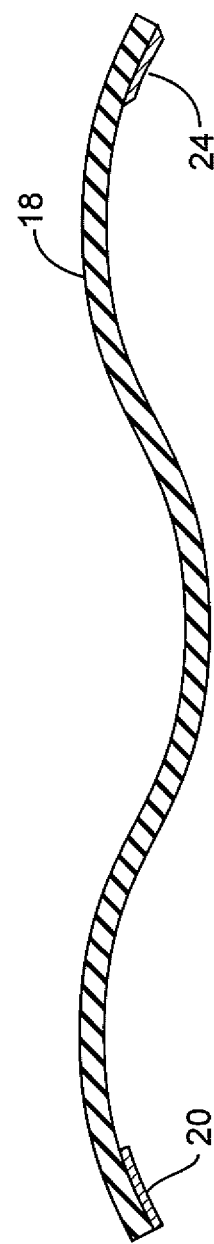
Figure 13D:
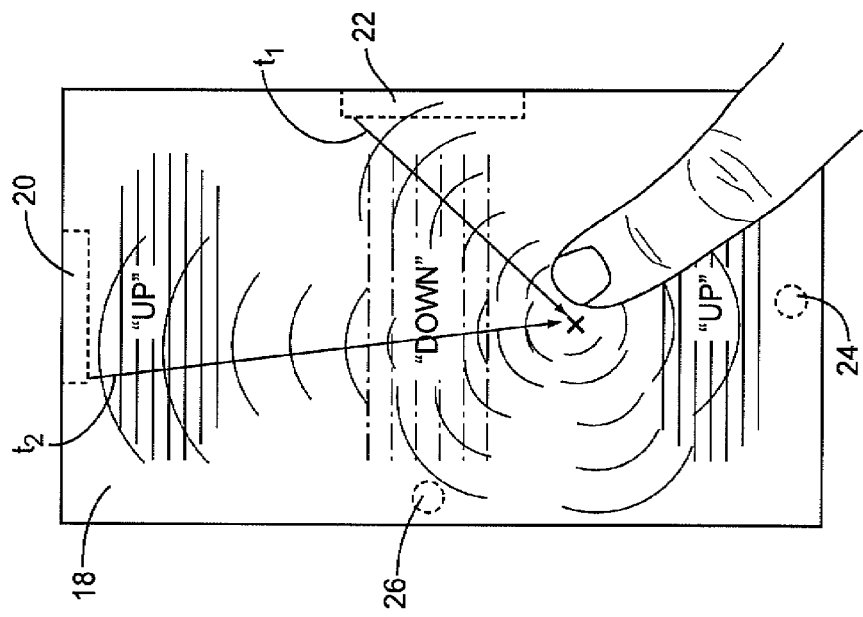
Figure 13C:
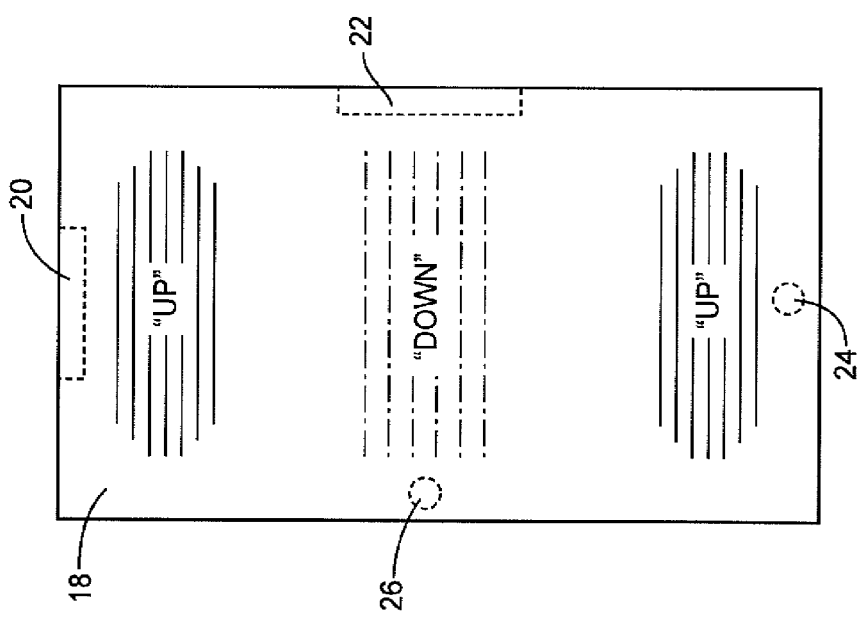

Another method of resolving ambiguities while determining touch location is seen in FIGS. 13A-13D. FIG. 13A illustrates a cross-sectional view of the display 18 having the haptic transducer 20 and the microphone 24 as it might appear at rest (i.e., without a standing wave applied). Responsive to a user touch, the haptic transducers 20, 22 will activate to vibrate the display 18. FIG. 13B illustrates the generated standing wave that propagates through the display 18, while FIGS. 13C-13D show views of the display 18 from the perspective above the top surface. As seen in FIGS. 13C-13D, the positive phase portions of the standing wave propagating through display 18 are denoted using the term "UP." The negative phase portion of the wave propagating through display 18 is denoted using the word "DOWN." The values $t_1$ and $t_2$ denote the propagation times for the leading edges of the vibrations to reach the location of the user touch from the haptic transducers 20, 22.

When the user places a finger, a stylus, or other object on display 18 (FIG. 13D), the standing waves modified by the user's touch propagate through the display 18 in all directions. From the measurements of propagation times $t_1$ and $t_2$, the device 10 has additional information regarding the location of the user's touch. Additionally, each of the two haptic transducers 20, 22 could be controlled to generate standing waves with different fundamental frequencies (e.g., $f_{20}$ and $f_{22}$) and corresponding sets of harmonics (e.g., $2-4f_{20}$ and $2-4f_{22}$). This approach allows both of the haptic transducers 20, 22 to be operated in the driver mode simultaneously. The microphones 24, 26, or other sensors would be able to distinguish between the modified standing waves where the sources (i.e., the haptic transducers 20, 22) are separated by 90 degrees. Alternately, the haptic transducers 20, 22 could be sequentially activated, as previously described.

Figure 14:
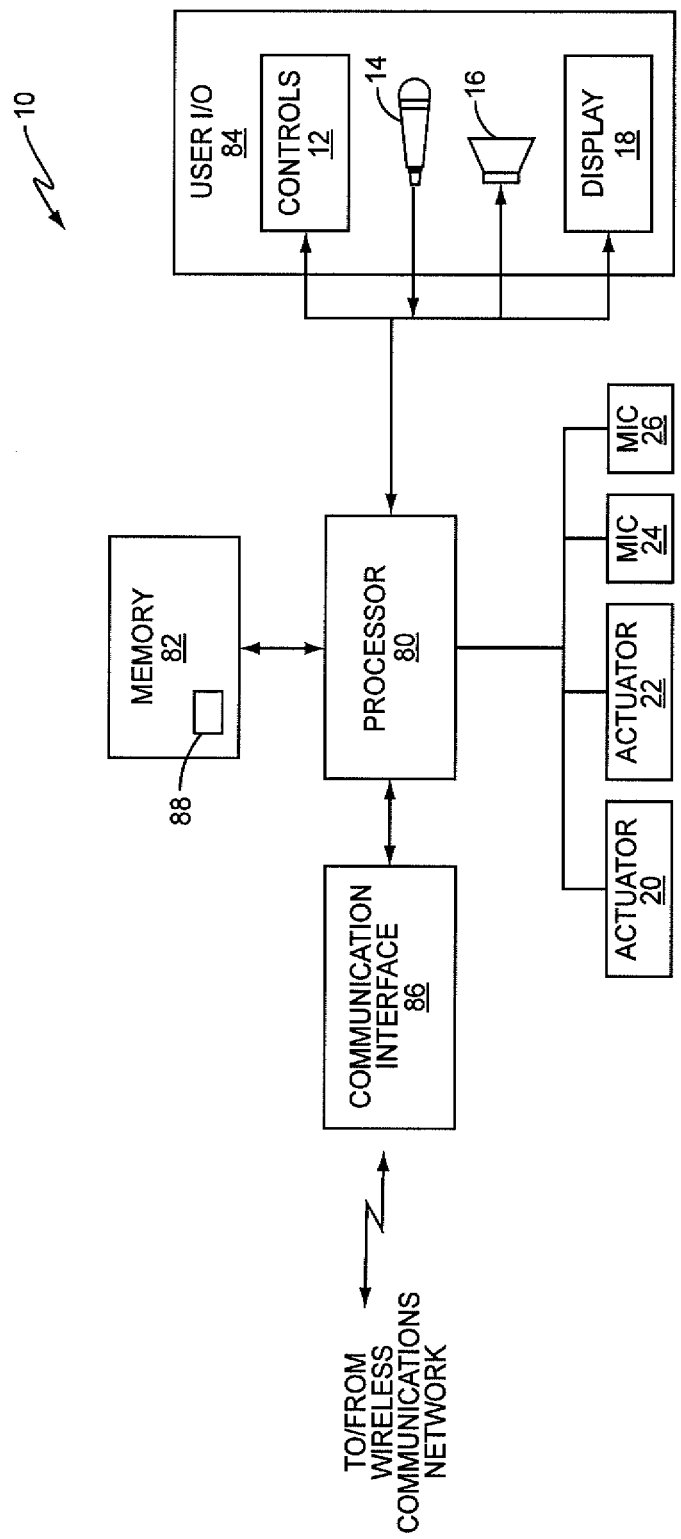
FIG. 14 is a block diagram illustrating some of the components of an electronic device configured according to one embodiment of the present invention.
Figure 15:
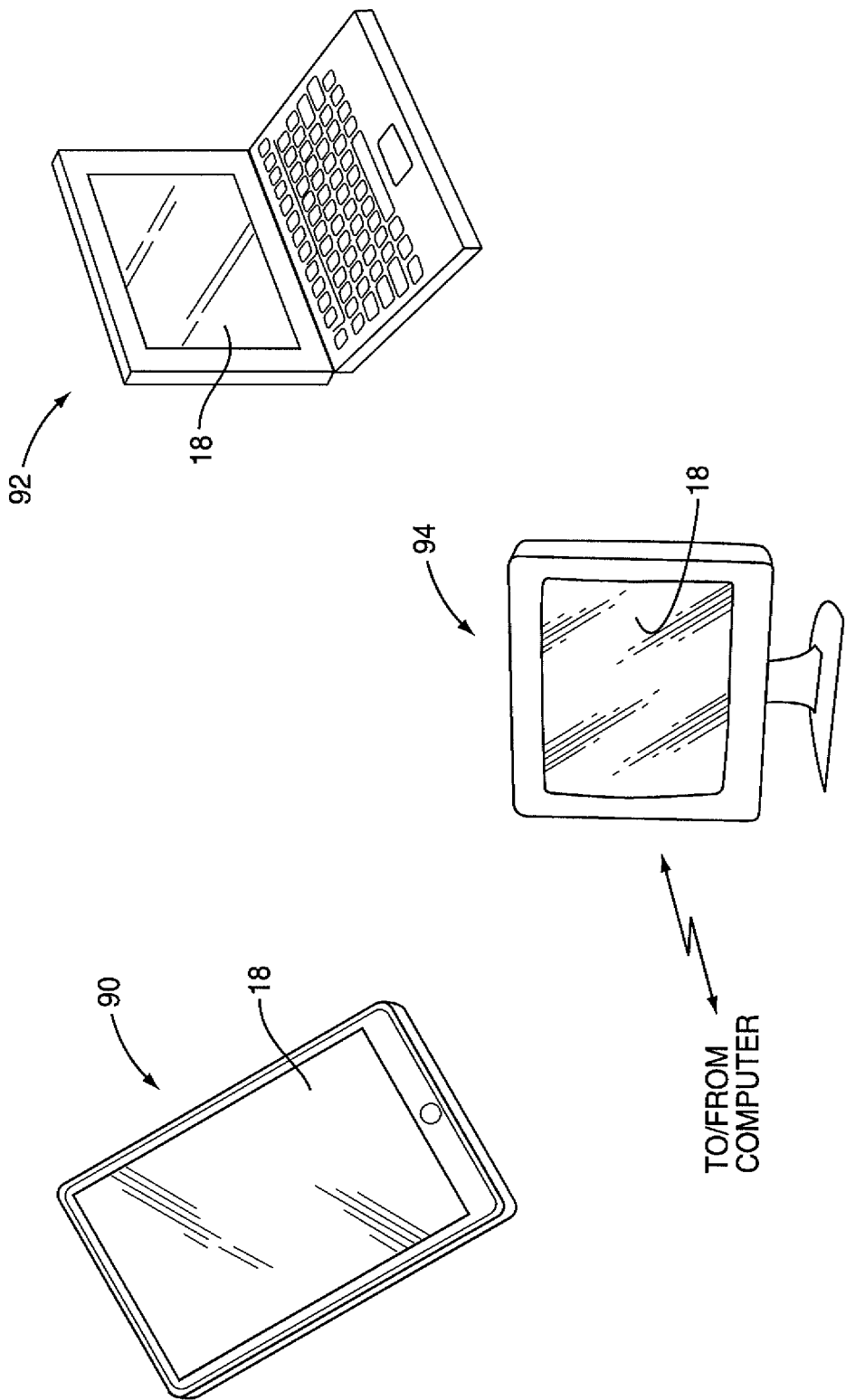
FIG. 15 shows perspective views of some exemplary types of electronic devices suitable for use with the present invention.

FIG. 14 is a block diagram illustrating some of the components of an electronic device 10 configured according to one embodiment of the present invention. Device 10 comprises a programmable controller 80, a memory 82, a user input/output interface 84, and a communications interface 88. As previously stated, device 10 also comprises a pair of haptic transducers 20, 22 and a pair of sensors 24, 26, which are indicated as microphones in the embodiment of FIG. 14.

Controller 80 generally controls the overall operation of device 10 according to programs and instructions stored in memory 82. The controller 80 may comprise a single microprocessor or multiple microprocessors executing firmware, software, or a combination thereof. The microprocessors may be general purpose microprocessors, digital signal processors, or other special purpose processors, and may further comprise special-purpose fixed or programmable logic or arithmetic units. The controller 80 is programmed to receive signals from the sensors 24, 26 (i.e., either the haptic transducers 20, 22 or the microphones), and analyze the signals to determine the location of a user's touch on display 18. The controller 80 is also programmed to resolve ambiguities as previously stated.

Memory 82 comprises a computer-readable medium that may include both random access memory (RAM) and read-only memory (ROM). Although not specifically shown, those skilled in the art will appreciate that the memory 82 may be embodied other hardware components, such as compact disks (CDs), hard drives, tapes, and digital video disks (DVDs) that may be connected to the device 10 via an interface port (not shown). Computer program instructions and data required for operation are stored in non-volatile memory, such as EPROM, EEPROM, and/or flash memory, which may be implemented as discrete devices, stacked devices, or integrated with the controller 80. One such computer program, indicated here as application 88, allows the controller 80 to function according to one or more embodiments of the present invention. Particularly, application 88 contains computer program instructions that, when executed by controller 80, causes the controller 80 to react to the detected user's touch by activating and deactivating the haptic transducers 20, 22 and/or microphones 24, 26, as well as analyzing the resultant signals received from those sensors to determine the location of the user touch.

The User Interface (UI) 84 includes one or more user input/output devices, such as a touch-sensitive display 18, a microphone 14, a speaker 16, and one or more global controls 12 to enable the user to interact with and control device 10. The communication interface 86 allows the device 10 to communicate messages and other data with one or more remote parties and/or devices. In this embodiment, the communication interface 86 comprises a fully functional cellular radio transceiver that can operate according to any known standard, including the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In other embodiments, however, the communication interface 86 may comprise a hardware port, such as an Ethernet port, for example, that connects device 10 to a packet data communications network. In yet another embodiment, the communication interface 86 may comprise a wireless LAN (802.11x) interface.

The present invention may, of course, be carried out in other ways than those specifically set forth herein without departing from the essential characteristics of the invention. For example, the previous embodiments describe the present invention in terms of the device 10 being a cellular telephone, and more particularly, a smartphone. However, the present invention is not so limited. In other embodiments, seen in FIG. 14, for example, device 10 comprises a tablet computing device, such as APPLE'S iPAD 90, or a personal computing device 92, such as a laptop or desktop computer, or a display device 94 connected to a server or other computing device.

Additionally, the display 18 has been described in the previous embodiments as being a touch-sensitive display. However, those skilled in the art should appreciate that a touch-sensitive display is not necessary. All that is needed is some way to indicate that a user has touched the display. For example, the display 18 could comprise a Liquid Crystal Display, and the device could include a control button on the side of the housing. The user could activate/deactivate the haptic transducers by manually actuating the button, for example. Therefore, the present embodiments are to be considered in all respects as illustrative and not restrictive, and all changes coming within the meaning and equivalency range of the appended claims are intended to be embraced therein.

What is claimed is:

1. A method of determining the location of a user touch on a display of an electronic device, the method comprising:
   generating standing waves to propagate through a display on an electronic device responsive to detecting a user touch on the display;
   detecting a sound of the standing waves affected by the user touch;
   converting an amplitude of the detected sound into digitized signals;
   computing an acoustic signature for the amplitude based on the digitized signals; and
   determining a location of the user touch on the display based on the computed acoustic signature.

2. The method of claim 1 wherein generating the standing waves comprises activating first and second haptic transducers on the display to generate the standing waves.

3. The method of claim 1 wherein generating standing waves to propagate through the display comprises configuring first and second haptic transducers disposed on the display to alternate between operating in a driver mode to generate the standing waves, and a sensor mode to detect variations in the standing waves caused by the user touch.

4. The method of claim 3 wherein configuring the first and second haptic transducers to switch between operating in the driver mode and the sensor mode comprises:
   configuring the first haptic transducer to operate in the driver mode to generate the standing waves;
   configuring the second haptic transducer to operate in the sensor mode; and
   detecting, at the second haptic transducer, the variations in the generated standing waves caused by the user touch.

5. The method of claim 4 further comprising:
   configuring the first haptic transducer to operate in the sensor mode;
   configuring the second haptic transducer to operate in the driver mode to generate the standing waves; and
   detecting, at the first haptic transducer, the variations in the generated standing waves caused by the user touch.

6. The method of claim 3 wherein determining the location of the user touch comprises:
   receiving signals from each of the first and second haptic transducers indicating an amplitude of the variations in the standing waves caused by the user's touch;
   computing a power spectrum value for the variations based on the amplitude; and
   analyzing the computed power spectrum value to determine the location of the user touch on the display.

7. The method of claim 1 further comprising:
   measuring a propagation time of a transient wave at one or more sensors disposed on the display; and
   determining the location of the user's touch based on variations in the transient wave caused by the user touch.

8. The method of claim 2 wherein the first and second haptic transducers are disposed on perpendicular sides of the display.

9. The method of claim 8 wherein activating the first and second haptic transducers comprises configuring the first and second haptic transducers to vibrate the display at different frequencies.

10. The method of claim 1 wherein detecting a sound of the standing waves affected by the user touch comprises detecting the sound of the variations in the standing wave using first and second microphones.

11. An electronic device comprising:
a display;
first and second haptic transducers connected to the display; and
a controller configured to:
control the first and second haptic transducers to generate standing waves that propagate through the display responsive to detecting a user touch on the display;
detect a sound of the standing waves affected by the user touch;
convert an amplitude of the detected sound into digitized signals;
compute an acoustic signature for the amplitude based on the digitized signals; and
determine a location of the user touch on the display based on the computed acoustic signature.

12. The device of claim 11 further comprising first and second microphones connected to the display to detect the sound of the standing waves affected by the user touch.

13. The device of claim 11 wherein the controller is further configured to alternately operate the first and second haptic transducers in a driver mode to generate the standing waves, and a sensor mode to detect variations in the standing waves caused by the user touch.

14. The device of claim 13 wherein the controller is further configured to:
configure the first haptic transducer to operate in the driver mode to generate the standing waves in the display;
configure the second haptic transducer to operate in the sensor mode; and
detect, at the second haptic transducer, the variations in the standing waves caused by the user touch.

15. The device of claim 13 wherein the controller is further configured to:
configure the first haptic transducer to operate in the sensor mode;
configure the second haptic transducer to operate in the driver mode to generate the standing waves in the display; and
detect, at the first haptic transducer, the variations in the standing waves caused by the user touch.

16. The device of claim 15 wherein the controller is further configured to:
receive signals from each of the first and second haptic transducers indicating an amplitude of the variations in the standing waves caused by the user touch;
compute a power spectrum value for the variations in the standing waves based on the amplitude of the variations in the standing waves; and
analyze the computed power spectrum to determine the location of the user's touch on the display.

17. The device of claim 11 wherein the controller is further configured to:
measure a propagation time of a transient wave propagating through the display at one or more sensors disposed on the display; and
determine the location of the user's touch based on variations in the transient wave propagating through the display and on the measured propagation time.

18. The device of claim 11 wherein the first and second haptic transducers are disposed on perpendicular sides of the display, and are configured to generate the standing waves in a surface material of the display and further comprising:
first and second sensors disposed on the display opposite the first and second haptic transducers, respectively, the first and second sensors configured to detect variations in the standing waves caused by the user's touch.

* * * * *